(12) United States Patent
Park et al.

(10) Patent No.: US 11,642,789 B2
(45) Date of Patent: May 9, 2023

(54) AUTOMATIC CALIBRATION METHOD AND DEVICE FOR ROBOT VISION SYSTEM

(71) Applicant: NEUROMEKA, Seoul (KR)

(72) Inventors: Jong Hoon Park, Namyangju-si (KR); Jun Su Kang, Gangjin-gun (KR)

(73) Assignee: NEUROMEKA, Seoul (KR)

( * ) Notice: Subject to any disclaimer, the term of this patent is extended or adjusted under 35 U.S.C. 154(b) by 0 days.

(21) Appl. No.: 17/772,074

(22) PCT Filed: Oct. 30, 2020

(86) PCT No.: PCT/KR2020/015028
§ 371 (c)(1),
(2) Date: Apr. 26, 2022

(87) PCT Pub. No.: WO2021/086108
PCT Pub. Date: May 6, 2021

(65) Prior Publication Data
US 2022/0379483 A1    Dec. 1, 2022

(30) Foreign Application Priority Data

Nov. 1, 2019 (KR) .................. 10-2019-0138460
Nov. 1, 2019 (KR) .................. 10-2020-0055963

(51) Int. Cl.
*B25J 9/16*    (2006.01)

(52) U.S. Cl.
CPC .......... *B25J 9/1692* (2013.01); *B25J 9/1648* (2013.01); *B25J 9/1653* (2013.01); *B25J 9/1664* (2013.01); *B25J 9/1697* (2013.01)

(58) Field of Classification Search
CPC ...... B25J 9/1692; B25J 9/1648; B25J 9/1653; B25J 9/1664; B25J 9/1697; B25J 9/161; G05B 2219/39008; G05B 2219/39016; G05B 2219/39045; G05B 2219/39057
See application file for complete search history.

(56) References Cited

FOREIGN PATENT DOCUMENTS

| CN | 109079775 A | * 12/2018 | ............. B25J 11/00 |
|---|---|---|---|
| JP | 2015-182144 A | 10/2015 | |
| KR | 10-0165435 B1 | 3/1999 | |
| KR | 10-0207722 B1 | 7/1999 | |
| KR | 10-0468857 B1 | 1/2005 | |
| KR | 10-2011-0046767 A | 5/2011 | |
| KR | 10-2014-0123660 A | 10/2014 | |
| KR | 10-2019-0027584 A | 3/2019 | |
| KR | 10-2111655 B1 | 6/2020 | |

OTHER PUBLICATIONS

Notice of Allowance dated Feb. 17, 2021 for Korean Application No. 10-2020-0055963.

* cited by examiner

*Primary Examiner* — Basil T. Jos (57) ABSTRACT

According to one aspect of the present invention, disclosed is an automatic calibration method for a calibration device connected to a camera that is disposed the end effector of a robot and to a robot controller for controlling the robot. The method comprises the steps of: acquiring, from the camera and the robot controller, a robot-based coordinate system and an image of a marker marked in the work area of the robot (wherein the acquired image and robot-based coordinate system are recorded while the end effector is moved to a plurality of sample coordinates); and estimating the position of a robot coordinate system-based marker by using the acquired image and robot-based coordinate system.

17 Claims, 5 Drawing Sheets

AUTOMATIC CALIBRATION METHOD AND DEVICE FOR ROBOT VISION SYSTEM

TECHNICAL FIELD

The disclosure relates to a calibration method, and more particularly to an automatic calibration method in a robot vision system.

BACKGROUND ART

A vision sensor is a very important component in usability of a robot system, but an accurate transformation between a coordinate system of the vision sensor and a coordinate system of a robot needs to be preceded. However, it is very difficult to perform calibration with respect to any robot and any camera without a separate device, such as a marker, the coordinates of which are fixed in advance.

In a particular case of low-end cameras, the camera has severe distortion, and therefore the coordinate system of the camera is often not completely obtained even though the intrinsic parameters of the camera are estimated through the calibration. To apply such an incomplete camera coordinate system to robot work, it is necessary to adopt an expedient of overfitting the calibration to a work area. However, calibration for any work site cannot be performed based on a previously defined position or under constraints.

DISCLOSURE

Technical Problem

The disclosure is to provide a method of automatically performing calibration with regard to camera intrinsic parameters such as a focal distance, an offset, a distortion constant, etc., and a position and angle offset between a camera and an end effector of a robot or between a camera and a robot-based coordinate system in a robot vision system where a camera is mounted to the robot or the camera is separately and stationarily used together with the robot

Technical Solution

According to an embodiment of the disclosure, an automatic calibration method of a calibration device connected to a camera provided in an end effector of a robot and to a robot controller controlling the robot includes: obtaining an image of a marker marked in a work area of the robot from the camera and a robot-based coordinate system from the robot controller, the obtained image and robot-based coordinate system being recorded while moving the end effector to a plurality of sample coordinates; and estimating a position of the robot coordinate system-based marker based on the obtained image and robot-based coordinate system.

The estimating the position of the robot coordinate system-based marker based on the obtained image and robot-based coordinate system may include estimating a camera-robot offset $T_{off}$ by setting the camera-robot offset $T_{off}$ as an assumed value and minimizing a coordinate error rate in converting a camera-based marker position $T_{mj}$ in a plurality of postures into the robot-based coordinate system by a nonlinear optimization algorithm.

The camera-robot offset $T_{off}$ may be calculated based on a function of variables including x-y-z coordinates and z-y-x Euler angles.

The camera-robot offset $T_{off}$ may represent a degree of deviation between a first sample coordinate and a second sample coordinate by an error of a rotation matrix R and an error of a position P, and is estimated by the nonlinear optimization algorithm that minimizes the error of a rotation matrix R and the error of a position P.

The camera-robot offset $T_{off}$ may be calculated by $$\underset{T_{off}}{\operatorname{argmin}} \sum_j \|\log(\Delta R_j)\|_F + \gamma \|\Delta P_j\|$$

$$\begin{bmatrix} \Delta R_j & \Delta P_j \\ 0 & 1 \end{bmatrix} = (T_{j-1} T_{off} T_{m,j-1})^{-1} T_j T_{off} T_{m,j}$$

where, j is an index of sample coordinates, $T_j$ is a transformation matrix of the sample coordinates j, $T_{mj}$ is the camera-based marker position in the sample coordinate j, R is a variable related to the rotation matrix, and P is a variable related to the error of the position.

The end effector may be provided with a taught movable area, and the movable area may be defined by a plurality of reference points as a reference area for calibration.

The plurality of sample coordinates may be disposed in an area surrounded by the plurality of reference points.

The plurality of sample coordinates may be extracted by: recording a transformation matrix from the robot-based coordinate system to a robot distal end in a plurality of reference points; recording variables, which determines positions of the plurality of reference coordinates based on the set operation center point, and extracting a minimum value and a maximum value of the variables; and extracting the plurality of sample coordinates through randomly weighted sums between the plurality of reference points.

The variables may include at least two of an azimuth angle, an elevation angle, a roll and a distance from the operation center point.

The transformation matrix $T_j$ of each sample coordinate system may be calculated from the variables of the plurality of extracted sample coordinates.

According to an embodiment of the disclosure, an automatic calibration method of a calibration device connected to a camera positioned as separated from a robot and to a robot controller controlling the robot includes: obtaining an image of a marker provided in an end effector of the robot from the camera and a robot-based coordinate system from the robot controller, the obtained image and robot-based coordinate system being recorded while moving the end effector to a plurality of sample coordinates; and estimating a robot base-based camera position from the obtained image.

The estimating the robot base-based camera position based on the obtained image and robot-based coordinate system may include estimating a robot end-marker offset $T_{em}$ by setting the robot end-marker offset $T_{em}$ as an assumed value and minimizing a coordinate error rate in converting a robot base-based camera position in a plurality of postures into the robot-based coordinate system by a nonlinear optimization algorithm.

The robot end-marker offset $T_{em}$ may be calculated based on a function of variables including x-y-z coordinates and z-y-x Euler angles.

The robot end-marker offset $T_{em}$ may represent a degree of deviation between a first sample coordinate and a second sample coordinate by an error of a rotation matrix and an error of a position, and is estimated by the nonlinear optimization algorithm that minimizes the error of a rotation matrix and the error of a position.

The robot end-marker offset $T_{em}$ may be calculated by $$T_{fix} = T_1 \left( \underset{T_{em}}{\operatorname{argmin}} \sum_j \|\log(\Delta R_j)\|_F + \gamma \|\Delta P_j\| \right) T_{m,1}^{-1}$$

$$\begin{bmatrix} \Delta R_j & \Delta P_j \\ 0 & 1 \end{bmatrix} = \left( T_{j-1} T_{em} T_{m,j-1}^{-1} \right)^{-1} T_j T_{em} T_{m,j}^{-1}$$

where, j is an index of sample coordinates, $T_j$ is a transformation matrix of the sample coordinates j, $T_{em}$ is an offset estimation value from a distal end of the robot to the marker, $T_{mj}$ is a position of the marker from the camera, R is a variable related to the rotation matrix, and P is a variable related to the error of the position.

According to an embodiment of the disclosure, a calibration device connected to a camera provided in an end effector of a robot and to a robot controller controlling the robot includes: an input unit configured to obtain an image of a marker marked in a work area of the robot from the camera and a robot-based coordinate system from the robot controller, the obtained image and robot-based coordinate system being recorded while moving the end effector to a plurality of sample coordinates; and a processor configured to estimate a camera-based marker position based on the obtained image and robot-based coordinate system.

According to an embodiment of the disclosure, a calibration device connected to a camera positioned as separated from a robot and to a robot controller controlling the robot includes: an input unit configured to obtain an image of a marker from the camera and a robot-based coordinate system from the robot controller, the obtained image and robot-based coordinate system being recorded while moving the end effector to a plurality of sample coordinates; and a processor configured to estimate a robot base-based camera position based on the obtained image.

Advantageous Effects

The automatic calibration method according to an embodiment of the disclosure has an effect on easily carrying out calibration for a robot vision system under any environment without separate constraints or a reference coordinate system where a marker is positioned at accurate coordinates in advance.

In particular, the automatic calibration method according to an embodiment of the disclosure has an effect on enabling a robot with a low-end camera having severe distortion to perform precise work under an environment with many constraints because calibration overfits any work area.

MODE FOR INVENTION

The disclosure can be variously modified and include various embodiments, and thus specific embodiments will be described in detail as illustrated in the accompanying drawings.

However, it will be understood that the disclosure is not limited to the specific embodiments but encompass all changes, equivalents and alternatives within the technical sprit and scope of the disclosure.

The terms 'first,' etc. may be used in describing various elements, but the elements are not limited by these terms. The terms are used only for the purpose of distinguishing one element from another. For example, a first element referred to as a first element in one embodiment can be referred to as a second element in another embodiment without departing from the scope of the appended claims. The term 'and/or' refers to a combination of a plurality of related items or any of the plurality of related items.

When a certain element is referred to as being "connected to" or "coupled to" another element, it will be understood that they may be directly connected to or coupled to each other but or intervening elements may be present therebetween. On the other hand, when a certain element is referred to as being "directly connected to" or "directly coupled to" another element, it will be understood that no intervening elements are present therebetween.

The terminologies used in the disclosure are intended to merely describe a specific embodiment, but not limit the disclosure. Unless the content clearly indicates otherwise, singular forms are intended to include plural forms as well. It will be further understood that the terms "include," "have," etc. used in the disclosure are intended to specify the presence of stated features, integers, steps, operations, elements, components, or combinations thereof, but not preclude the presence or addition of one or more other features, integers, steps, operations, elements, components, or combinations thereof.

Unless defined otherwise, all terms used herein including technical or scientific terms have the same meanings as those generally understood by a person having ordinary knowledge in the art to which the disclosure pertains. The terms such as those defined in generally used dictionaries are construed to have meanings matching that in the context of related technology and, unless clearly defined otherwise, are not construed to be ideally or excessively formal.

Blow, embodiments of the disclosure will be described in more detail with reference to the accompanying drawings. In terms of describing the disclosure, for easy overall understanding, like numerals refer to like elements, and repetitive descriptions will be avoided as necessary.

Figure 1:
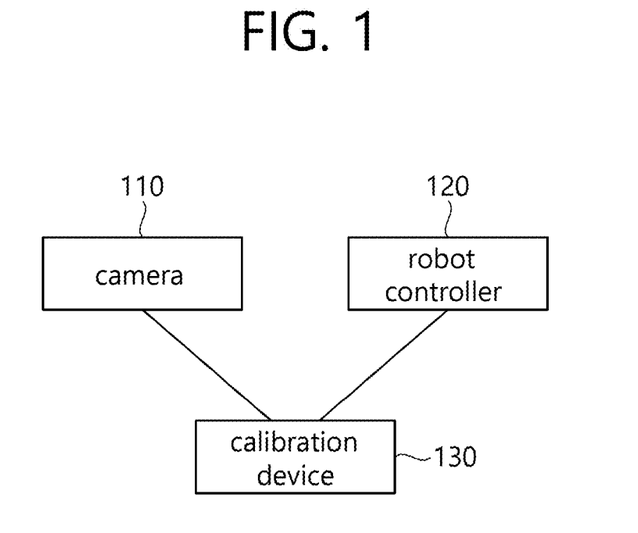
FIG. 1 is a block diagram schematically illustrating a robot vision system to which an automatic calibration method according to an embodiment of the disclosure is applied.

FIG. 1 is a block diagram schematically illustrating a robot vision system to which an automatic calibration method according to an embodiment of the disclosure is applied. As shown in FIG. 1, a robot vision system according to an embodiment of the disclosure may include a camera 110, a robot controller 120, and a calibration device 130.

Referring to FIG. 1, the calibration device 130 interworks with the camera 110 and the robot controller 120 to obtain a captured image, in particular, image information about a marker, from the camera 110, and obtain information related to robot control from the robot controller 120. The information related to the robot control may include variable information (e.g., an elevation angle, an azimuth angle, etc.) which determines coordinate information or a position in a robot coordinate system when a robot is located in a specific area such as a reference point or sample coordinates. The robot controller 120 may include an encoder.

According to an embodiment of the disclosure, the camera 110 may be mounted to a distal end, i.e., an end effector of the robot, capture a maker positioned in a movable area of the robot, and obtain captured image information. This embodiment may be a first embodiment. Further, according to a second embodiment, the camera 110 may be stationarily positioned as separated from the robot, and the marker may be attached to the distal end of the robot, so that calibration can be performed by setting an area on a captured image, in which the marker is visible, as the movable area.

The calibration device 130 may obtain the information from the camera 110 and the robot controller 120, and automatically calibrate not only intrinsic parameters of the camera but also an offset value between the robot and the camera. This will be described in more detail with reference to FIG. 2.

Figure 2:
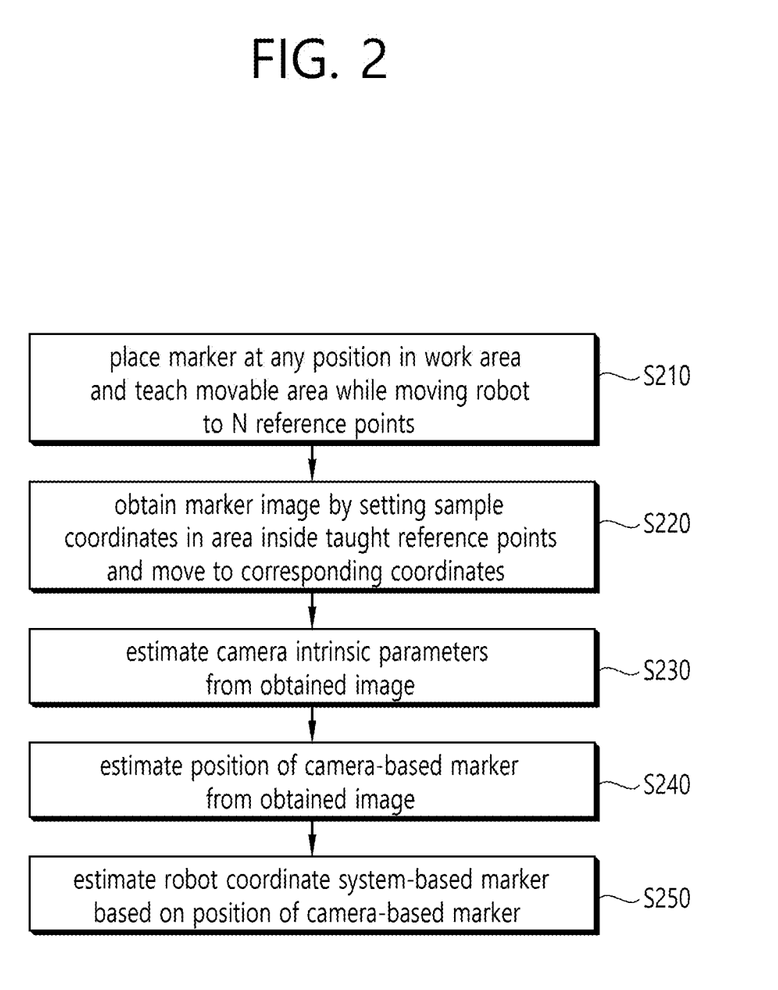
FIG. 2 is a flowchart schematically illustrating an automatic calibration method according to an embodiment of the disclosure.

FIG. 2 is a flowchart schematically illustrating an automatic calibration method according to an embodiment of the disclosure.

Referring to FIG. 2, the marker is placed at any position in a work area of the robot, and a user teaches the movable area while moving the robot to N reference points (S210). In this case, direct teaching, indirect teaching, or the like method may be used. This procedure will be described in more detail with reference to FIG. 3.

Figure 3:
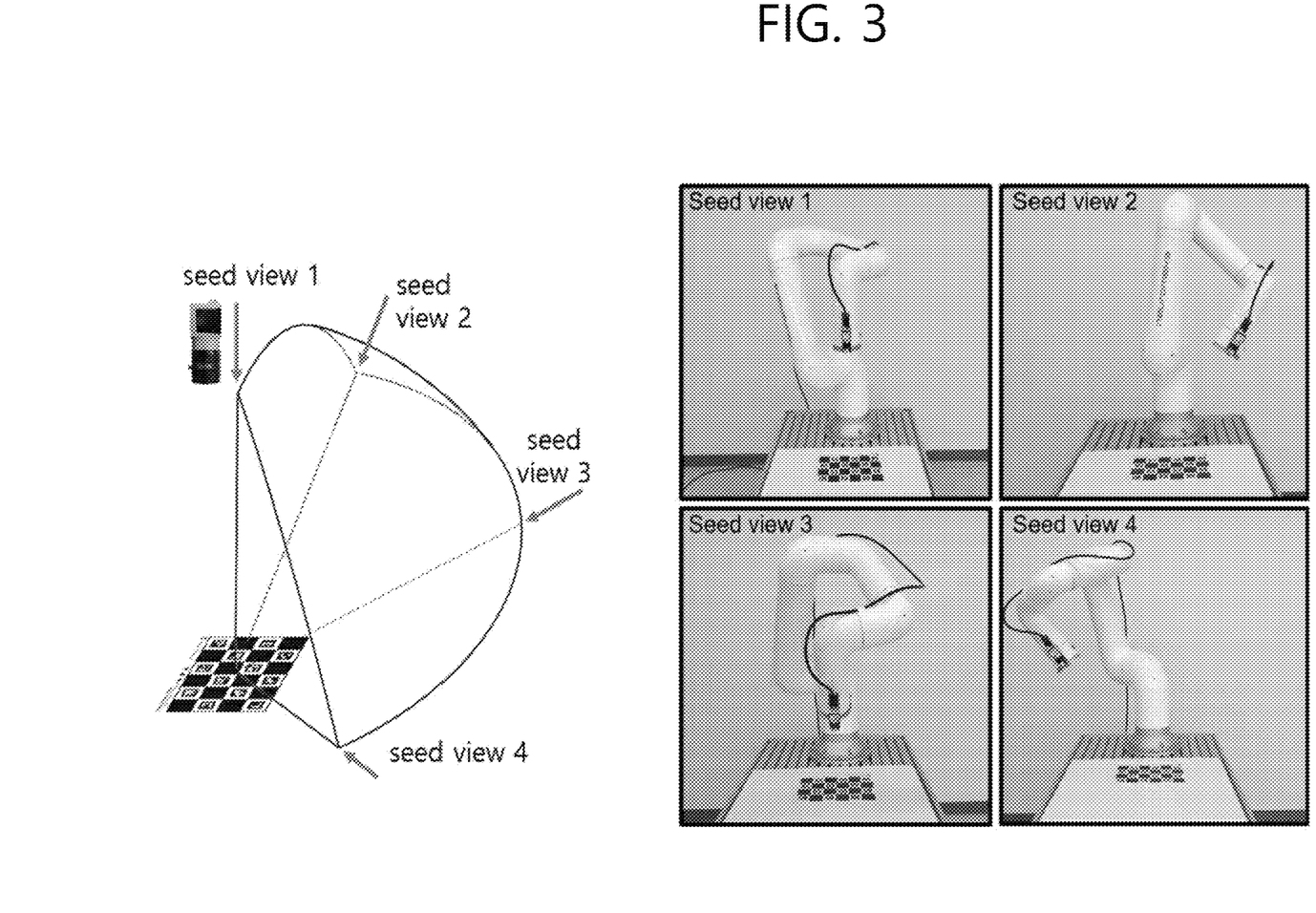
FIG. 3 is a conceptual view for describing that N reference points are designated in an automatic calibration method according to an embodiment of the disclosure.

FIG. 3 is a conceptual view for describing that N reference points are designated in an automatic calibration method according to an embodiment of the disclosure.

Referring to FIG. 3, to perform calibration at any work position, a user may variably designate an area which is used as a reference for performing the calibration. This may be performed by a user through the direct teaching, the indirect teaching, or the like method. According to an embodiment of the disclosure, the marker is placed at a position of the base of the robot or on a certain area (i.e., the work area of the robot) from the corresponding position, and N reference points are designated to be used as the edges of the area where the robot will be moved while performing the calibration.

According to an embodiment of the disclosure, the number of reference points may be 4. From these reference points, N seed views may be obtained.

Referring back to FIG. 2, the device obtains a marker image by setting sample coordinates in an area inside the taught reference points, i.e., in the movable area and moving to the set coordinates (S220). According to an embodiment of the disclosure, about 15 to 25 sample coordinates may be set. Preferably, 20 sample coordinates may be set. In this case, the procedure of FIG. 4 may be carried out to uniformly select the sample coordinates.

Figure 4:
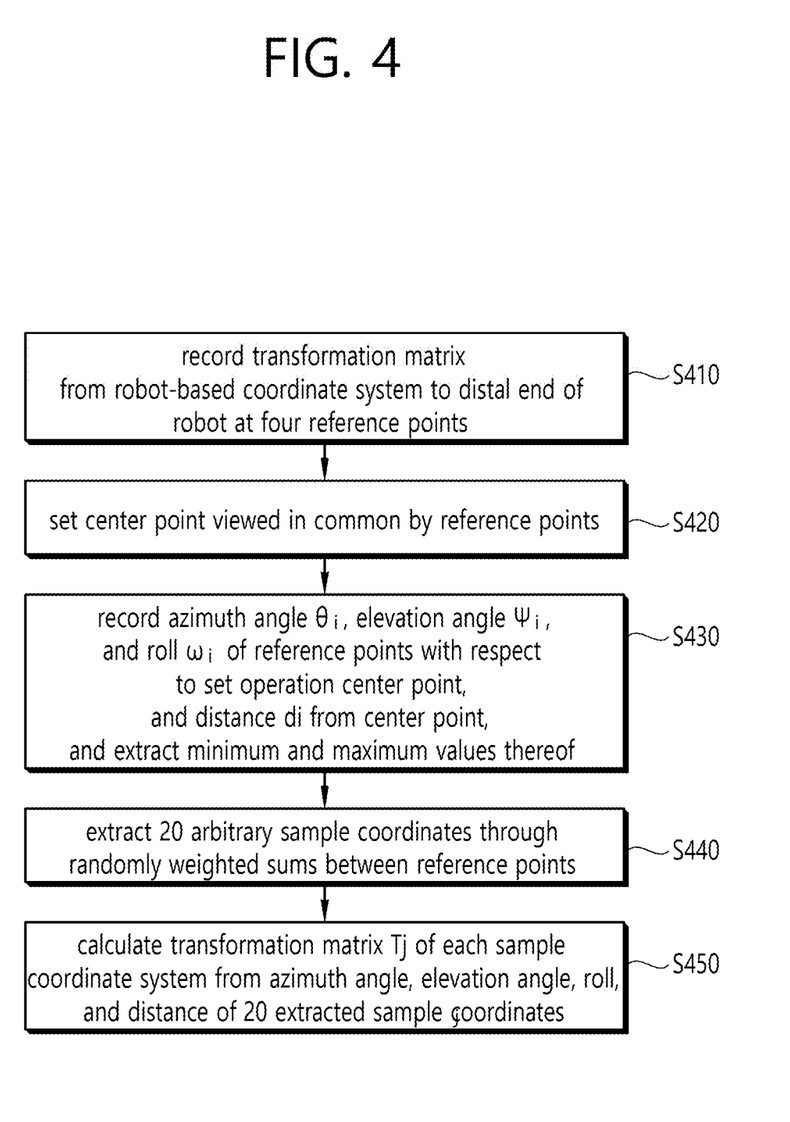
FIG. 4 is a detailed flowchart specifically illustrating a method of uniformly selecting sample coordinates in an automatic calibration method according to an embodiment of the disclosure.

FIG. 4 is a detailed flowchart specifically illustrating a method of uniformly selecting sample coordinates in an automatic calibration method according to an embodiment of the disclosure.

Referring to FIG. 4, the transformation matrix $T_i$, $i \in \{1, \ldots, N\}$ from the robot-based coordinate system to the distal end of the robot at the four reference points set in step S210 is recorded. Here, i indicates the index of the reference point (S410).

Then, the device sets an operation center point, which is viewed in common by the reference points, to extract the origin of a spherical coordinate system in which the robot will move (S420). To this end, a point closest to a Z-axis in all end coordinate systems may be extracted as the operation center point by solving the following minimization problem (S420).

$$\underset{x}{\operatorname{argmin}} \sum_i \left\| \begin{bmatrix} 1 & 0 & 0 & 0 \\ 0 & 1 & 0 & 0 \end{bmatrix} T_i^{-1} x \right\| \qquad \text{[Expression 1]}$$

Then, an azimuth angle $\theta_i$, an elevation angle $\Psi_i$, and a roll $\omega_i$ of the reference points with respect to the operation center point set in step S420, and a distance di from the operation center point are recorded, and the minimum and maximum values of these variables are extracted (S430). These are represented by the following variable values: $\theta_{min}$, $\theta_{max}$, $\Psi_{min}$, $\Psi_{max}$, $\omega_{min}$, $\omega_{max}$, $d_{min}$, and $d_{max}$.

Next, the device extracts a plurality of arbitrary sample coordinates through randomly weighted sums between the reference points (S440). In this case, the number of sample coordinates may be about 15 to 25, and preferably 20. To obtain uniform sample coordinates in the spherical coordinate system, the following expression may be used.

$$\theta_j = r \cdot (\theta_{max} - \theta_{min}) + \theta_{min}, d_j = r \cdot (d_{max} - d_{min}) + d_{min}, \qquad \text{[Expression 2]}$$

$$\Psi_j = \alpha \, \cos(r \cdot (\cos(\Psi_{max}) - \cos(\Psi_{min})) + \cos(\Psi_{min})), j \in \{1, \ldots, 20\}$$

Here, r is a random number between 0 and 1.

Further, the transformation matrix $T_j$ of each sample coordinate system is calculated from at least one among the azimuth angle, the elevation angle, the roll, and the distance of about 20 newly extracted sample coordinates (S450).

Referring back to FIG. 2, after setting the sample coordinates and calculating the transformation matrix thereof, the end effector of the robot is moved to the calculated sample coordinates and the image of the marker is obtained at each sample coordinate.

Then, the camera intrinsic parameters are estimated from the obtained image (S230), and a camera-based marker position $T_{mj}$ is estimated from each image (S240). The estimated camera intrinsic parameter may include a focal distance, an offset, a distortion constant, etc.

Then, the position of the robot coordinate system-based marker is estimated based on the estimated camera-based marker position (S250).

According to an embodiment of the disclosure, the device employs a nonlinear optimization algorithm to estimate the position of the robot coordinate system-based marker. The device estimates a camera-robot offset $T_{off}$ in such a way that the coordinates $T_j$, $T_{off}$, $T_{mj}$ obtained by transforming the camera-based marker position values in various postures into the robot-based coordinate system have the minimum errors. Here, $T_{mj}$ represents the camera-based marker position in specific sample coordinates, and j represents the index of the sample coordinates. In this case, the nonlinear optimization algorithm may use various algorithms such as the Broyden-Fletcher-Goldfarb-Shanno (BFGS) algorithm, etc. In particular, for the efficiency and convergence of the calculation, $T_{off}$ may be calculated based on a function of 6 variables such as x-y-z coordinates and z-y-x Euler angles. This may be expressed by the following expression.

$$\underset{T_{off}}{\operatorname{argmin}} \sum_j \|\log(\Delta R_j)\|_F + \gamma \|\Delta P_j\| \qquad \text{[Expression 3]}$$

-continued $$\begin{bmatrix} \Delta R_j & \Delta P_j \\ 0 & 1 \end{bmatrix} = (T_{j-1}T_{off}T_{m,j-1})^{-1}T_jT_{off}T_{m,j}$$

Here, $T_{off}$ is input as an assumed value, and the nonlinear algorithm is executed in such a way that $T_{off}$ has the minimum error. Referring to the lower expression in Expression 3, the transformation matrix of the sample coordinate j-1 previous to the sample coordinate j, $T_{off}$, and the position $T_{mj-1}$ of the marker from the camera are calculated, and then the inverse of them is taken. Further, in the term related to the sample coordinate j, only a value corresponding to a degree of deviation between the two points remains on a path of going to the sample coordinate j-1 and coming back to the sample coordinate j as the calculation is made forward. Referring to the upper expression in Expression 3, ||log(ΔRj)|| representing the norm of a rotation matrix and r||ΔPj|| representing the norm of a position error are combined to form the norm of the total errors related to $T_{off}$, and a sigma (Σ) value is taken from this norm of the total errors, thereby generating a value obtained by summing the capturing error values in the whole sample coordinates, and performing the calibration procedure to minimize the obtained value.

According to another embodiment of the disclosure, the marker is attached to the distal end of the robot in a work environment where the camera is separately installed, and the reference points are set in the area of the camera image, in which the marker is visible, to similarly carry out the series of procedures shown in FIG. 2, thereby estimating a robot end-marker offset $T_{em}$ and thus estimating a robot base-based camera position) ($T_{fix}=T_1\hat{T}_{em}T_{m,1}^{-1}$). Here, $T_j$ represents the transformation matrix of the robot. $T_{em}$ represents an offset estimation value from the distal end of the robot to the marker, and $T_{mj}$ represents the position of the marker from the camera. This is expressed as follows.

$$T_{fix} = T_1\left(\underset{T_{em}}{\operatorname{argmin}}\sum_j \|\|\log(\Delta R_j)\|_F + \gamma\|\Delta P_j\|\|\right)T_{m,1}^{-1} \quad \text{[Expression 4]}$$

$$\begin{bmatrix} \Delta R_j & \Delta P_j \\ 0 & 1 \end{bmatrix} = (T_{j-1}T_{em}T_{m,j-1}^{-1})^{-1}T_jT_{em}T_{m,j}^{-1}$$

$T_{mj}^{-1}$ is the transformation matrix from the marker to the camera, and the robot end-marker offset $T_{em}$ is estimated as well as the robot base-based camera position in such a way that the rotation matrix and the position matrix have the minimum error with respect to the error between the position of the camera from the robot-based coordinate system of the sample coordinate j-1 previous to the sample coordinate j and the position of the camera from the robot-based coordinate system of the sample coordinate j.

Figure 5:
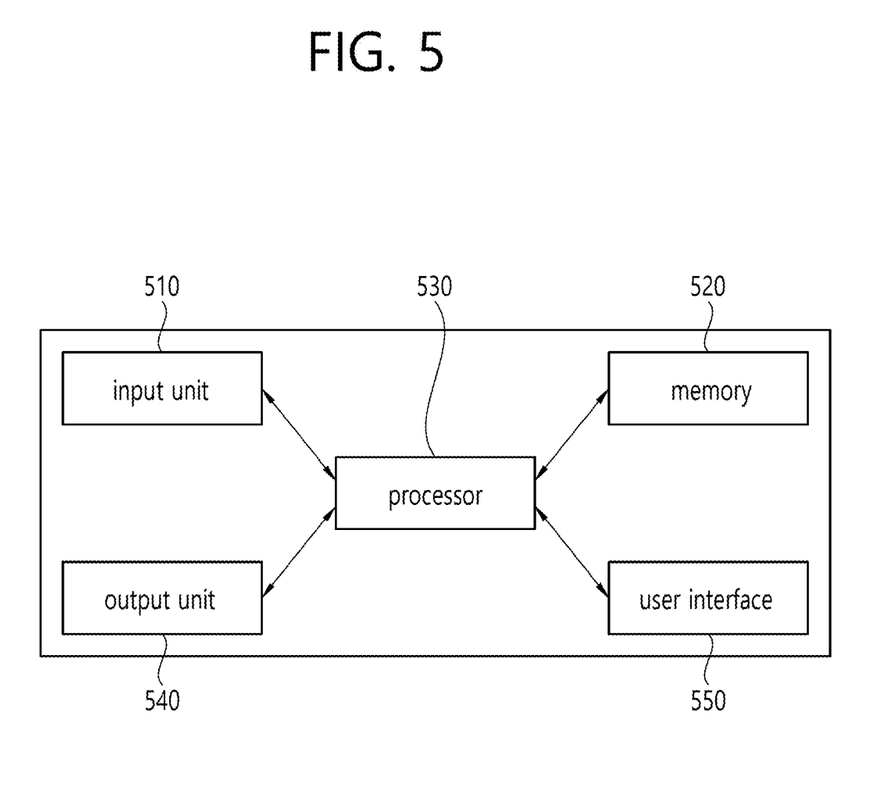
FIG. 5 is a block diagram schematically illustrating an automatic calibration device according to an embodiment of the disclosure.

FIG. 5 is a block diagram schematically illustrating an automatic calibration device according to an embodiment of the disclosure. As shown in FIG. 5, the automatic calibration device according to an embodiment of the disclosure may include an input unit 510, a memory 520, a processor 530, an output unit 540, and a user interface 550.

The input unit 510 may obtain information from the camera and the robot controller(or the robot encoder). The input unit 510 may obtain information about a captured image from the camera, and may obtain information, which represents the position of the robot in the robot coordinate system when the image is captured, and information, which is related to control instructions for the robot, from the robot controller.

The memory 520 is storing instructions related to an automatic calibration procedure of the processor 530.

The processor 530 calibrates the camera intrinsic parameters and the robot-camera offset at once. The processor 530 receives a robot coordinate system and a plurality of marker images obtained through the input unit 510, when the robot automatically moves in a movable area after the marker is placed at any position in a work area and the robot is moved to a plurality of reference coordinates to teach the movable area, thereby estimating the camera intrinsic parameters from the corresponding image and estimating the camera-based marker position from each image. In this case, when the camera-based marker position is converted into the robot-based coordinate system in various postures by the nonlinear algorithm, the camera-robot offset having the minimum error rate is estimated.

The output unit 540 outputs the estimated camera intrinsic parameters and the camera-robot offset information.

The user interface 550 is an element used for setting various values to be set in the corresponding device.

Although drawings and embodiments have been described above, the scope of the disclosure is not limited by the drawings or embodiments, and various modifications and changes can be made by those skilled in the art without departing from the sprit and scope of the disclosure defined in the appended claims.

The invention claimed is:

1. An automatic calibration method of a calibration device connected to a camera provided in an end effector of a robot and to a robot controller controlling the robot, the method comprising:
   obtaining an image of a marker marked in a work area of the robot from the camera and a robot-based coordinate system from the robot controller, the obtained image and robot-based coordinate system being recorded while moving the end effector to a plurality of sample coordinates; and
   estimating a position of the robot coordinate system-based marker based on the obtained image and robot-based coordinate system.

2. The automatic calibration method of claim 1, wherein the estimating the position of the robot coordinate system-based marker based on the obtained image and robot-based coordinate system comprises
   estimating a camera-robot offset $T_{off}$ by setting the camera-robot offset $T_{off}$ as an assumed value and minimizing a coordinate error rate in converting a camera-based marker position $T_{mj}$ in a plurality of postures into the robot-based coordinate system by a nonlinear optimization algorithm.

3. The automatic calibration method of claim 2, wherein the camera-robot offset $T_{off}$ is calculated based on a function of variables comprising x-y-z coordinates and z-y-x Euler angles.

4. The automatic calibration method of claim 3, wherein the camera-robot offset $T_{off}$ represents a degree of deviation between a first sample coordinate and a second sample coordinate by an error of a rotation matrix R and an error of a position P, and is estimated by the nonlinear optimization algorithm that minimizes the error of a rotation matrix R and the error of a position P.

5. The automatic calibration method of claim 4, wherein the camera-robot offset $T_{off}$ is calculated by $$\operatorname*{argmin}_{T_{\textit{off}}} \sum_j \|\log(\Delta R_j)\|_F + \gamma \|\Delta P_j\|$$

$$\begin{bmatrix} \Delta R_j & \Delta P_j \\ 0 & 1 \end{bmatrix} = (T_{j-1} T_{\textit{off}} T_{m,j-1})^{-1} T_j T_{\textit{off}} T_{m,j}$$

where, j is an index of sample coordinates, $T_j$ is a transformation matrix of the sample coordinates j, $T_{mj}$ is the camera-based marker position in the sample coordinate j, R is a variable related to the rotation matrix, and P is a variable related to the error of the position.

6. The automatic calibration method of claim 1, wherein the end effector is provided with a taught movable area, and the movable area is defined by a plurality of reference points as a reference area for calibration.

7. The automatic calibration method of claim 6, wherein the plurality of sample coordinates is disposed in an area surrounded by the plurality of reference points.

8. The automatic calibration method of claim 1, wherein the plurality of sample coordinates is extracted by:
   recording a transformation matrix from the robot-based coordinate system to a robot distal end in a plurality of reference points;
   recording variables, which determines positions of the plurality of reference coordinates based on the set operation center point, and extracting a minimum value and a maximum value of the variables; and
   extracting the plurality of sample coordinates through randomly weighted sums between the plurality of reference points.

9. The automatic calibration method of claim 8, wherein the variables comprise at least two of an azimuth angle, an elevation angle, a roll and a distance from the operation center point.

10. The automatic calibration method of claim 8, wherein the transformation matrix $T_j$ of each sample coordinate system is calculated from the variables of the plurality of extracted sample coordinates.

11. An automatic calibration method of a calibration device connected to a camera positioned as separated from a robot and to a robot controller controlling the robot, the method comprising:
   obtaining an image of a marker provided in an end effector of the robot from the camera and a robot-based coordinate system from the robot controller, the obtained image and robot-based coordinate system being recorded while moving the end effector to a plurality of sample coordinates; and
   estimating a robot base-based camera position from the obtained image.

12. The automatic calibration method of claim 11, wherein the estimating the robot base-based camera position based on the obtained image and robot-based coordinate system comprises estimating a robot end-marker offset $T_{em}$ by setting the robot end-marker offset $T_{em}$ as an assumed value and minimizing a coordinate error rate in converting a robot base-based camera position in a plurality of postures into the robot-based coordinate system by a nonlinear optimization algorithm.

13. The automatic calibration method of claim 12, wherein the robot end-marker offset $T_{em}$ is calculated based on a function of variables comprising x-y-z coordinates and z-y-x Euler angles.

14. The automatic calibration method of claim 13, wherein the robot end-marker offset $T_{em}$ represents a degree of deviation between a first sample coordinate and a second sample coordinate by an error of a rotation matrix and an error of a position, and is estimated by the nonlinear optimization algorithm that minimizes the error of a rotation matrix and the error of a position.

15. The automatic calibration method of claim 14, wherein the robot end-marker offset $T_{em}$ is calculated by $$T_{\textit{ftx}} = T_1 \left( \operatorname*{argmin}_{T_{em}} \sum_j \|\log(\Delta R_j)\|_F + \gamma \|\Delta P_j\| \right) T_{m,1}^{-1}$$

$$\begin{bmatrix} \Delta R_j & \Delta P_j \\ 0 & 1 \end{bmatrix} = (T_{j-1} T_{em} T_{m,j-1}^{-1})^{-1} T_j T_{em} T_{m,j}^{-1}$$

where, j is an index of sample coordinates, $T_j$ is a transformation matrix of the sample coordinates j, $T_{em}$ is an offset estimation value from a distal end of the robot to the marker, $T_{mj}$ is a position of the marker from the camera, R is a variable related to the rotation matrix, and P is a variable related to the error of the position.

16. A calibration device connected to a camera provided in an end effector of a robot and to a robot controller controlling the robot, the calibration device comprising:
   an input unit configured to obtain an image of a marker marked in a work area of the robot from the camera and a robot-based coordinate system from the robot controller, the obtained image and robot-based coordinate system being recorded while moving the end effector to a plurality of sample coordinates; and
   a processor configured to estimate a camera-based marker position based on the obtained image and robot-based coordinate system.

17. A calibration device connected to a camera positioned as separated from a robot and to a robot controller controlling the robot, the calibration device comprising:
   an input unit configured to obtain an image of a marker from the camera and a robot-based coordinate system from the robot controller, the obtained image and robot-based coordinate system being recorded while moving an end effector to a plurality of sample coordinates; and
   a processor configured to estimate a robot base-based camera position based on the obtained image.

* * * * *